(12) United States Patent
Yiu

(10) Patent No.: US 11,711,734 B2
(45) Date of Patent: *Jul. 25, 2023

(54) DYNAMIC PROTOCOL STACK RESET DURING RADIO HANDOVER

(71) Applicant: Apple Inc., Cupertino, CA (US)

(72) Inventor: Candy Yiu, Portland, OR (US)

(73) Assignee: Apple Inc., Cupertino, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/228,482

(22) Filed: Apr. 12, 2021

(65) Prior Publication Data

US 2021/0235331 A1 Jul. 29, 2021

Related U.S. Application Data

(63) Continuation of application No. 16/348,380, filed as application No. PCT/US2017/061115 on Nov. 10, 2017, now Pat. No. 10,979,944.

(Continued)

(51) Int. Cl.
*H04W 36/00* (2009.01)
*H04W 36/38* (2009.01)
(Continued)

(52) U.S. Cl.
CPC .... *H04W 36/0055* (2013.01); *H04W 36/0011* (2013.01); *H04W 36/38* (2013.01);
(Continued)

(58) Field of Classification Search
CPC ......... H04W 36/0055; H04W 36/0011; H04W 36/38; H04W 36/08; H04W 36/02; H04W 88/08; H04W 88/085
See application file for complete search history.

(56) References Cited

U.S. PATENT DOCUMENTS

2009/0149189 A1* 6/2009 Sammour ............. H04W 80/02
455/450
2015/0304071 A1* 10/2015 Koskinen .......... H04W 36/0016
370/331

(Continued)

FOREIGN PATENT DOCUMENTS

WO WO-2016195735 A1 * 12/2016 ........ H04W 36/0022
WO 2018089803 5/2018

OTHER PUBLICATIONS

"3GPP; TSGRAN; Study on New Radio Access Technology Radio Access Architecture and Interfaces Release 14", 3GPP TR 38.801 V0.3.0, (Sep. 13, 2016).

(Continued)

*Primary Examiner* — Habte Mered
(74) *Attorney, Agent, or Firm* — Kowert, Hood, Munyon, Rankin & Goetzel, P.C.

(57) ABSTRACT

An apparatus of a base station (BS) of a radio access network (RAN) comprises memory and processing circuitry. The processing circuitry includes a central unit (CU) portion and a distributed unit (DU) portion that implement a BS multi-layer protocol stack divided between the CU portion and the DU portion. The processing circuitry initiates a handover to change a serving cell of user equipment (UE). The handover includes a change in a portion of logical layers of the BS multi-layer protocol stack, and the processing circuitry encodes an information element for transmission to the UE indicating logical layers of a UE multi-layer protocol stack implemented in the UE to be reset by the UE in association with the handover.

20 Claims, 11 Drawing Sheets

Related U.S. Application Data

(60) Provisional application No. 62/421,858, filed on Nov. 14, 2016.

(51) Int. Cl.
  *H04W 88/08* (2009.01)
  *H04W 36/08* (2009.01)
  *H04W 36/02* (2009.01)

(52) U.S. Cl.
  CPC ............ *H04W 36/02* (2013.01); *H04W 36/08* (2013.01); *H04W 88/08* (2013.01); *H04W 88/085* (2013.01)

(56) References Cited

U.S. PATENT DOCUMENTS

| | | | |
|---|---|---|---|
| 2017/0156059 A1* | 6/2017 | Palat | H04W 12/041 |
| 2017/0222876 A1* | 8/2017 | Van Der Velde | H04L 41/0816 |
| 2018/0199245 A1* | 7/2018 | Futaki | H04W 16/32 |
| 2018/0213450 A1* | 7/2018 | Futaki | H04W 88/10 |
| 2018/0302834 A1* | 10/2018 | Zhang | H04W 36/0022 |
| 2018/0352487 A1* | 12/2018 | Fan | H04W 12/041 |
| 2019/0021128 A1* | 1/2019 | Sivavakeesar | H04W 76/19 |
| 2019/0253942 A1* | 8/2019 | Yoo | H04W 76/27 |
| 2019/0319686 A1* | 10/2019 | Chen, IV | H04B 7/0628 |
| 2020/0367117 A1* | 11/2020 | Yi | H04W 36/0061 |

OTHER PUBLICATIONS

"Grouping of NR User Planer-unctions and Placements in CU-DU Split", R2-166506 3GPP TSGRAN IVG2 Meetinq 95his, 130 Sep. 2016), 1-5.

"International Application Serial No. PCT/US2017/061115, International Search Report dated Apr. 2, 2018", 4 pgs.

"Internafonai Appiication Serial No. PCT/US20-17/061115, Written Opinion dated Apr. 2, 2018", 8 pgs.

Cisco, et aL, "Verizon 5G TF; Network and Signaling Working Group; Verizon 5th Generation Radio Access; Overall Description (Release 1 )",TS V5G.300 v.1 .0, (Jun. 29, 2016).

Nadt:R, Zt:IN, et al., "Proposed options for functional splits for CRAN and fronthaul", IEE.E Standards Association, ( Aug. 14, 2016), 1-10.

\* cited by examiner

```
-- ASN1START

MobilityControlInfo ::=     SEQUENCE {
    targetPhysCellId            PhysCellId,
    carrierFreq                 CarrierFreqEUTRA                                        OPTIONAL,   -- Cond
HO-toEUTRA2
    carrierBandwidth            CarrierBandwidthEUTRA                                   OPTIONAL,   -- HO-
toEUTRA
    additionalSpectrumEmission  AdditionalSpectrumEmission                              OPTIONAL,   -- HO-
toEUTRA
    t304                        ENUMERATED {
                                    ms50, ms100, ms150, ms200, ms500, ms1000,
                                    ms2000, ms10000-v1310},
    newUE-Identity              C-RNTI,
    radioResourceConfigCommon   RadioResourceConfigCommon,
    rach-ConfigDedicated        RACH-ConfigDedicated                                    OPTIONAL,   -- Need OP
    ...,
540 ─→ protocolReset           bit string(sizeof(4))                                   OPTIONAL,   -- Need OR
    [[ carrierFreq-v9e0         CarrierFreqEUTRA-v9e0                                   OPTIONAL    -- Need ON
    ]],
    [[ drb-ContinueROHC-r11     ENUMERATED {true}                                       OPTIONAL    -- Cond HO
    ]]
}
```

*Fig. 5A*

```
MobilityControlInfoSCG-r12 ::= SEQUENCE {
    t307-r12 ENUMERATED {
        ms50, ms100, ms150, ms200, ms500, ms1000,
        ms2000, spare1},
    ue-IdentitySCG-r12          C-RNTI                              OPTIONAL, -- Cond
                                                                              SCGEst,
    rach-ConfigDedicated-r12    RACH-ConfigDedicated    OPTIONAL, -- Need OP
    cipheringAlgorithmSCG-r12   CipheringAlgorithm-r12  OPTIONAL, -- Need ON
    ...
}

CarrierBandwidthEUTRA ::= SEQUENCE {
    dl-Bandwidth ENUMERATED {
        n6, n15, n25, n50, n75, n100, spare10,
        spare9, spare8, spare7, spare6, spare5,
        spare4, spare3, spare2, spare1},
    ul-Bandwidth ENUMERATED {
        n6, n15, n25, n50, n75, n100, spare10,
        spare9, spare8, spare7, spare6, spare5,
        spare4, spare3, spare2, spare1} OPTIONAL -
```

Fig. 5B

```
    Need OP
}

CarrierFreqEUTRA ::=          SEQUENCE {
    dl-CarrierFreq                ARFCN-ValueEUTRA,
    ul-CarrierFreq                ARFCN-ValueEUTRA          OPTIONAL -- Cond FDD
}

CarrierFreqEUTRA-v9e0 ::=     SEQUENCE {
    dl-CarrierFreq-v9e0           ARFCN-ValueEUTRA-r9,
    ul-CarrierFreq-v9e0           ARFCN-ValueEUTRA-r9       OPTIONAL -- Cond FDD
}

-- ASN1STOP
```

Fig. 5C

```
MobilityControlInfo ::=    SEQUENCE {
    targetPhysCellId           PhysCellId,
    carrierFreq                CarrierFreqEUTRA                        OPTIONAL, -- Cond
    HO-toEUTRA2
                carrierBandwidth   CarrierBandwidthEUT                 OPTIONAL, -- Cond
    h toEUTRA
            additionalSpectrumEmissio   AdditionalSpectrumEmissi
    n toEUTRA
    t304                       ENUMERATED {
                                   ms50, ms100, ms150, ms200, ms500, ms1000,
                                   ms2000, ms10000-v1310},
    newUE-Identity             C-RNTI,
    radioResourceConfigComm    RadioResourceConfigCommon,
    on rach-ConfigDedicated    RACH-                                    OPTIONAL, -- Need
    ...,
642 ─→ SecurityUpdateSkip      ENUMERATED {true}                        OPTIONAL, -- Need
    [[ carrierFreq-            CarrierFreqEUTRA-v9e0                    OR OPTIONAL --
    v9e0
    ]],
    [[drb-ContinueROHC-r11     ENUMERATED                               OPTIONAL -- Cond
}
```

Fig. 6A

```
MobilityControlInfoSCG-r12 ::= SEQUENCE {
    t307-r12 ENUMERATED {ms50, ms100, ms150, ms200, ms500, ms1000,
                         ms2000,
                         ...},
    ue-IdentitySCG-
    r12 SCGEst,
    rach-ConfigDedicated-r12    RACH-
                                ConfigDedicated                 OPTIONAL, -- Need OP
    cipheringAlgorithmSCG-r12                                   OPTIONAL, -- Need ON
    ...
}

CarrierBandwidthEUTRA ::= SEQUENCE {
    dl-Bandwidth ENUMERATED {n6, n15, n25, n50, n75, n100, spare10,
                             spare9, spare8, spare7, spare6, spare5,
                             spare4, spare3, spare2, spare1},
    ul-            ENUMERATED {n6, n15, n25, n50, n75, n100, spare10,
                               spare9, spare8, spare7, spare6, spare5,
                               spare4, spare3, spare2, spare1} OPTIONAL, --
Need OP
}
```

Fig. 6B

```
CarrierFreqEUTRA ::=      SEQUENCE {
    dl-CarrierFreq          ARFCN-ValueEUTRA,
    ul-CarrierFreq          ARFCN-ValueEUTRA      OPTIONAL -- Cond
}

CarrierFreqEUTRA-v9e0 ::= SEQUENCE {
    dl-CarrierFreq-v9e0     ARFCN-ValueEUTRA-r9,
    ul-CarrierFreq-v9e0     ARFCN-ValueEUTRA-r9   OPTIONAL -- Cond
}
```

Fig.6C

DYNAMIC PROTOCOL STACK RESET DURING RADIO HANDOVER

PRIORITY APPLICATION

This application is a continuation of U.S. patent application Ser. No. 16/348,380, filed May 8, 2019, which is a U.S. National Stage Application under 35 U.S.C. 371 from International Application No. PCT/US2017/061115, filed Nov. 10, 2017, published as WO 2018/089803, which claims the benefit of priority to U.S. Provisional Application Ser. No. 62/421,858, filed Nov. 14, 2016 both of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments described herein generally relate to radio access networks (e.g. Third Generation Partnership Project, or 3GPP networks), including fifth generation (5G) new radio (NR) networks, and in particular to handovers of user equipment (UE) to serving cells in a radio access network.

BACKGROUND

Radio access networks can be used for delivering voice communications to user equipment such as a mobile cellular telephone or a smart phone. A cellular telephone network includes fixed location transceivers distributed over land areas. The transceivers and the areas that they serve can be referred to as cells of the cellular network. Cell transceivers of the network may be included in cell towers to serve large land areas and cell transceivers may be arranged to serve smaller areas or to provide localized service such as within a building. UE of the cellular network are mobile devices. When UE is moving, a communication session may have to be handed over from the current cell serving the communication session to a new serving cell. When a handover is performed between cells some re-initialization between the new cell and the UE is required. This can cause latency in voice communications. Thus, there are general needs for devices, systems and methods that provide a robust protocol for communication with UEs and yet minimize delay or interruption in end-to-end voice communications.

BRIEF DESCRIPTION OF THE DRAWINGS

FIGS. 5A-5C show an example of mobility control information communicated to user equipment in accordance with some embodiments;

FIGS. 6A-6C show another example of mobility control information communicated to user equipment in accordance with some embodiments;

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Radio frequency devices that communicate using a radio access network include mobile user equipment such as cell phones, laptop computers, and tablet computers. The user equipment communicates with a cell that connects the user equipment to the backhaul of the cell network. When the user equipment changes locations, the user equipment needs to synchronize its communications with the new cell. This handover process can result in latency in end-to-end voice communications. Cell networks under development may have cells that are physically located in more than one location, and the conventional handover process may not have to be performed. Thus, the latency that typically occurs with handover from one cell to another may be reduced.

Figure 1:
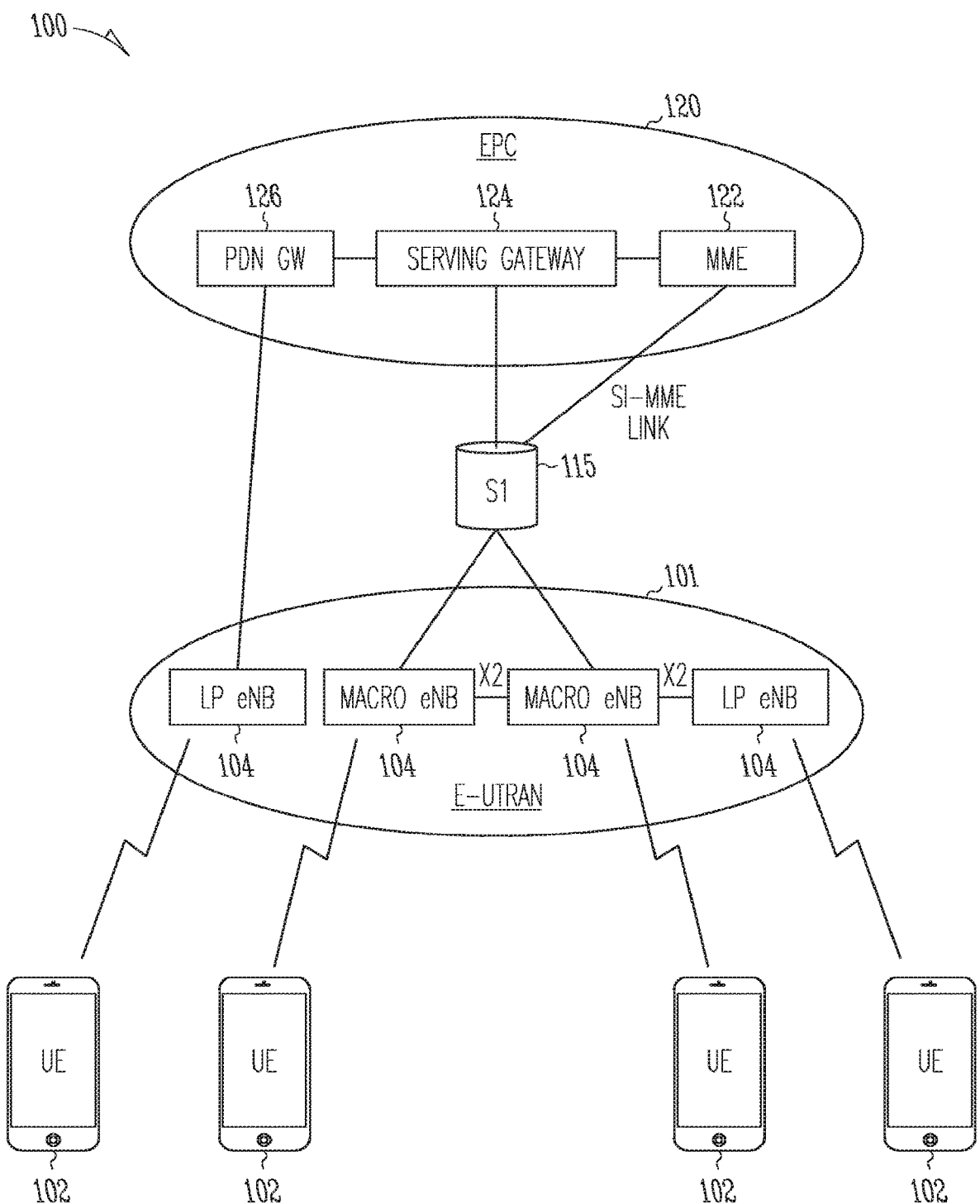
FIG. 1 is a diagram of a portion of an end-to-end network architecture of a 3GPP network in accordance with some embodiments.

FIG. 1 is a diagram of a portion of an end-to-end network architecture of an LTE network with various components of the network in accordance with some embodiments. The network 100 comprises a radio access network (RAN) (shown as an E-UTRAN or evolved universal terrestrial radio access network) and the core network 120 (e.g., shown as an evolved packet core (EPC)) coupled together through an S1 interface 115. For convenience and brevity sake, only a portion of the core network 120 is shown as well as the RAN 101.

The core network 120 includes mobility management entity (MME) 122, serving gateway (serving GW) 124, and packet data network gateway (PDN GW) 126. The RAN 101 includes enhanced node Bs (eNBs) 104 (which may operate as base stations (BSs)) for communicating with user equipment (UE) 102. The eNBs 104 may include macro eNBs and low power (LP) eNBs.

The MME 122 is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the cNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus. LP eNB may be implemented with a picocell eNB since it is coupled to a macro eNB via an X2 interface. Picocell eNBs or other LP cNBs may incorporate some or all functionality of a macro cNB. In some cases, this may be referred to as an access point base station or enterprise femtocell.

When a UE 102 is travelling it may pass from the region of one eNB 104 to another eNB 104. The need for a handover to another cell can be detected by the source eNB of the UE using signal measurement reporting from the UE. When the measurement reporting indicates a handover, the source eNB then notifies the target eNB of the handover and passes all necessary information to the target eNB. The source eNB sends a handover (HO) command to the UE. The HO command can include the source eNB sending the RRCConnectionReconfiguration message including mobility information mobilityControlInformation to the UE.

When the HO command is received, the UE synchronizes to the target eNB. The UE also resets its multi-layer protocol stack and transmits a Random Access Channel request (RACH) preamble to the target eNB. The target eNB transmits a Random Access Response (RAR) to the UE. The UE may send an RRCConnectionReconfigurationComplete message to the target eNB to complete the handover when it receives the RAR. The target eNB can then begin to communicate data with the UE.

Figure 2:
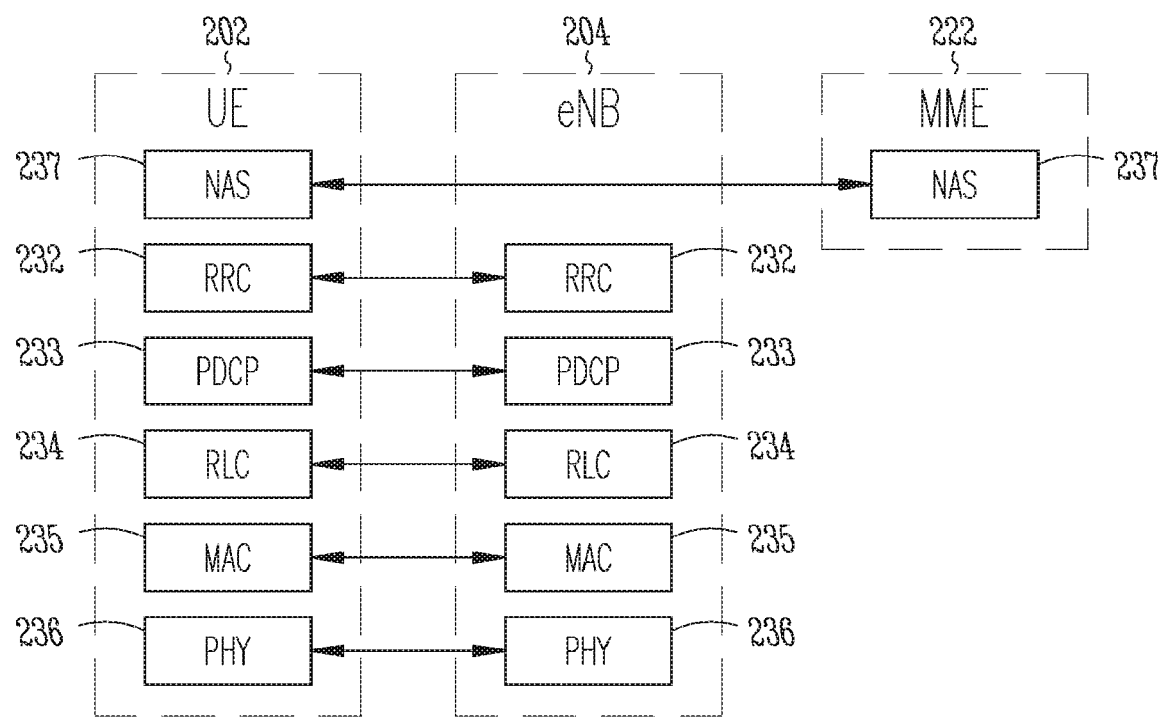
FIG. 2 is a block diagram of portions of an LTE network and the logical layers of radio access network multi-layer protocol stack in accordance with some embodiments.

FIG. 2 is a block diagram of a UE 202, an eNB 204, and an MME 222, and the logical layers of the E-UTRAN multi-layer protocol stack. The logical layers of the multi-layer protocol stack include a physical (PHY) layer, a medium access control (MAC) layer, a radio link control (RLC) layer, a packet data convergence control (PDCP) layer, and a radio resource control (RRC) layer.

The PHY Layer 236 is the lowest layer in the protocol layer hierarchy and carries all information from the MAC transport channels over the air interface. The PHY layer may perform link adaptation based on adaptive modulation and coding (AMC), power control, cell search (for initial synchronization and handover purposes), and other measurements for the RRC layer.

The MAC Layer 235 may be responsible for, among other things, mapping between logical channels and transport channels, multiplexing of MAC service data units (SDUs) from one or more logical channels onto transport blocks (TBs) to be delivered to the PHY layer on transport channels, de-multiplexing of MAC SDUs from one or more logical channels from TBs delivered from the PHY layer on transport channels, scheduling information reporting, and logical channel prioritization.

The RLC layer 234 may operate in three modes of operation: transparent mode (TM), unacknowledged mode (UM), and acknowledged mode (AM). The RLC Layer may be responsible for transfer of upper layer protocol data units (PDUs), error correction through automatic repeat request (ARQ), concatenation, segmentation and reassembly of RLC SDUs. The RLC layer may also be responsible for re-segmentation of RLC data PDUs, reordering of RLC data PDUs, duplicate detection, RLC SDU discard, RLC re-establishment, and protocol error detection.

The PDCP layer 233 may be responsible for header compression and decompression of Internet protocol (IP) data, transfer of data (user plane or control plane), maintenance of PDCP Sequence Numbers (SNs), in-sequence delivery of upper layer PDUs at re-establishment of lower layers, duplicate elimination of lower layer SDUs at re-establishment of lower layers for radio bearers mapped on RLC AM, ciphering and deciphering of user plane data and control plane data, integrity protection and integrity verification of control plane data, timer based discard, duplicate discarding, PDCP is used for signaling radio bearers (SRBs) and data radio bearers (DRBs) mapped on logical channels such as dedicated control channels (DCCHs) and dedicated traffic channels (DTCHs).

The RRC layer 232 may be responsible for broadcast of System Information related to the non-access stratum (NAS), broadcast of System Information related to the access stratum (AS), paging, establishment, maintenance and release of an RRC connection between the UE and E-UTRAN, security functions including key management, establishment, configuration, maintenance and release of point-to-point radio bearers.

FIG. 2 also shows the non-access stratum (NAS) protocols layer. The NAS layer 237 forms the highest stratum of the control plane between the UE 202 and MME 222. NAS protocols support the mobility of the UE and the session management procedures to establish and maintain IP connectivity between the UE and the PDN GW. As part of the handover to the target eNB, the UE resets the protocol stack including the PDCP, RLC. MAC and PHY layers. In fifth generation (5G) new radio (NR), the NR Node B base station (gNB) has a different organization than the LTE eNB.

Figure 3:
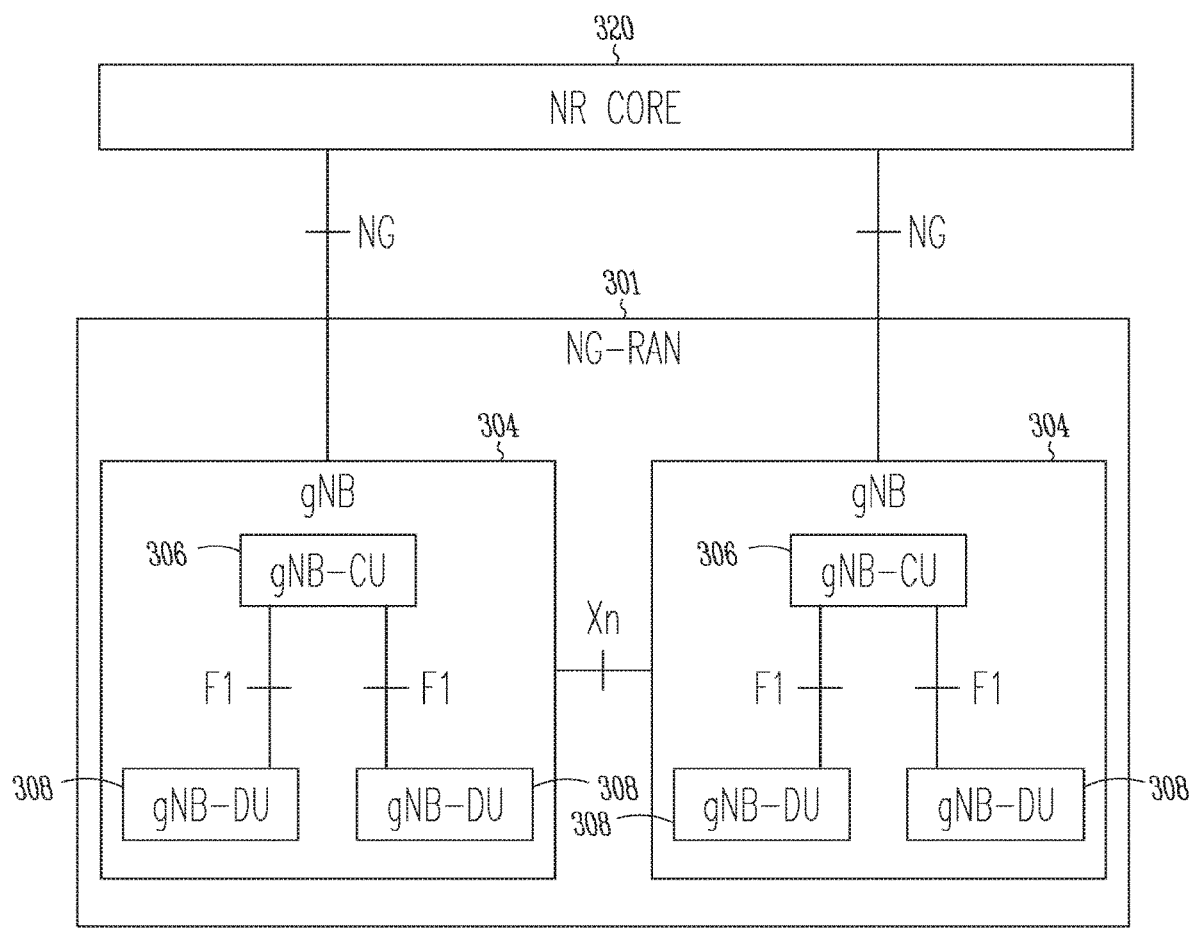
FIG. 3 is a block diagram of an embodiment of portions of new radio network in accordance with some embodiments.

FIG. 3 is a block diagram of an embodiment of portions of an NR network 300 in accordance with some embodiments. The network includes an NR core 320 and a next generation radio access network (NG-RAN) 301. The NG-RAN 301 includes next generation node Bs or gNBs (which may operate as base stations). The NG interface 315 is the interface that separates the NG-RAN 301 and the NR Core 320. The Xn interface is the interface between gNBs 304. The processing circuitry of a gNB 304 can be divided or split between a central unit (CU) 306 and one or more distributed units (DUs) 308. F1 is the interface between a CU 306 and DU 308. A CU 306 is centralized and may serve multiple DUs 308. A CU 306 does not need to be co-located with a CU 306, and a DU 308 may serve multiple transmission and reception point (TRPs) (which may include antenna arrays) including micro TRPs and macro TRPs.

Figure 4:
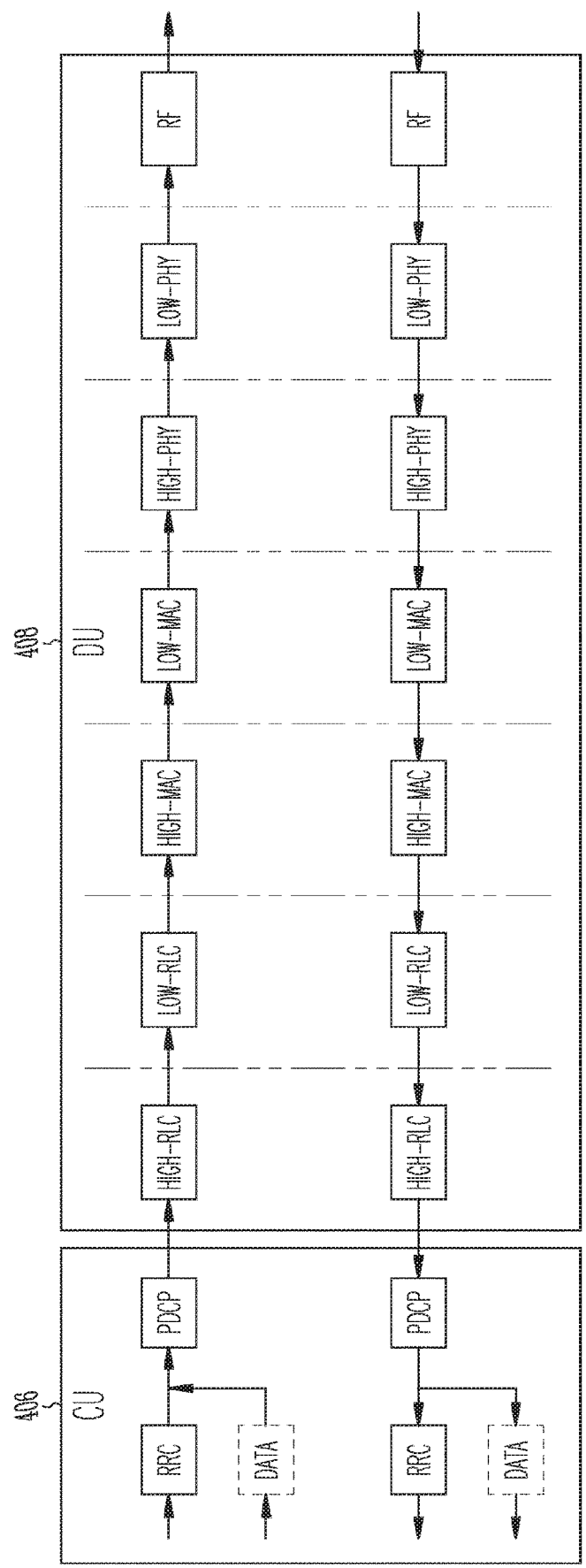
FIG. 4 is a block diagram of an example embodiment of a central unit and a distributed unit of a station and the logical layers of a multi-layer protocol stack in accordance with some embodiments.

FIG. 4 is a block diagram of an example embodiment of a CU 406 and DU 408 and the logical layers of a multi-layer protocol stack implemented using the processing circuitry of the CU 406 and DU 408. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

In NR, the multi-layer protocol stack is split between the CU 406 and the DU 408, with the CU including the higher logical layers in the layer hierarchy. The logical layers shown include the RRC layer, the PDCP layer. RLC-hi layer, RLC-lo layer, MAC-hi layer, MAC-lo layer. PHY-hi layer, and PHY-lo layer. In the embodiment of FIG. 4, the split in logical layers between the CU and DU occurs between the PDCP layer and the RLC layer. But the split between the logical layers can be implemented between any of the layers as indicated by the vertical dashed lines, such as an RRC/PDCP split, an RLC-hi/RLC-lo split, an RLC/MAC split, or a MAC/PHY split for example.

Because the DUs are not co-located with the CUs, a handover may involve a transfer of UE service between DUs served by the same CU. As explained previously, handover includes resetting the logical layers of the multi-layer protocol stack, and the reset process can introduce latency in voice communications. Instead of resetting the entire multi-layer stack of the UE, an improved approach is to only reset those layers that change due to the handover. e.g., only resetting those layers that are included in the DU when the DU changes. This can reduce the latency of the handover. A complication in this approach is that different implementations of a gNB may split the logical layers differently between the CU and the DU.

For example, if the CU/DU logical layer split of the gNB is between the PDCP/RLC layers, only the RLC/MAC/PHY layers of the UE need to be reset during handover. In another example, if the CU/DU split is between the RLC-hi/RLC-lo layers, only the RLC/MAC/PHY layers or the MAC/PHY layers of the UE need to be reset during handover. In still another example, if the CU/DU split is between the RLC/MAC layers, only the MAC/PHY layers of the UE need to be reset during handover. In a further example, if the CU/DU split is between the MAC/PHY layers of the gNB, only the PHY layer of the UE needs to be reset during handover. In some cases, the PHY may not need to be reset if the PHY layer does not contain state information.

To accommodate gNBs with different CU/DU logical layer splits, a dynamic configuration of the reset is communicated from the gNB to the UE. Because the CU remains the same during the handover, the processing circuitry of the gNB (e.g., the CU) can communicate which layers the UE needs to be reset for a handover to the new DU. The processing circuitry of the gNB encodes an information element for transmission to the UE that indicates the logical layer or layers of the multi-layer protocol stack that needs to be reset in association with the handover. This information element can be included with the handover information that is communicated to the UE. In some embodiments, the information element is included with the mobility control information sent to the UE.

FIGS. 5A-5C show an example of mobility control information communicated to the UE. The mobility control information is based on the LTE network mobility control information (MobilityControlInfo), but includes an information element called protocolReset 540. The protocolReset field indicates to the UE which protocol layer(s) need to be reset during handover. In some embodiments, the protocolReset field is a bit string in the mobility information (e.g., bit string (size of (4)). In certain embodiments, the bit string includes four bits. The first bit may indicate whether the PDCP protocol layer needs to be reset, the second bit may indicate whether the RLC protocol layer needs to be reset, the third bit may indicate whether the MAC protocol layer needs to be reset, and the fourth bit may indicate whether the PHY protocol layer needs to be reset. Multiple bits can be set to indicate multiple layers to reset.

Alternatively, the protocolReset field can be defined as ENUMERATED {PDCP, RLC, MAC, PHY}. In this option, one layer is indicated in the protocolReset field, and the indicated layer and the layers in the hierarchy below the indicated layer are reset by the UE during the handover. For example, if the PDCP protocol is indicated in the protocolReset field, the UE resets the PDCP/RLC/MAC/PHY layers during handover. In another example, if the MAC protocol layer is indicated in the protocolReset field, the UE resets the MAC/PHY layers during handover.

Another aspect of handover that can impact latency is a security update. LTE networks use security key management methods to perform a secured handover process. Security key management is performed using one or both of the RRC layer and the PDCP layer of the multi-layer protocol stack. Currently, a security update is generally performed in LTE networks when a handover occurs.

If a handover is within a gNB a security update may not be necessary as part of the handover. This can reduce latency in voice communications if the handover is within the gNB, or "intra-gNB" handover instead of between gNBs or an "inter-gNB" handover. If the handover is inter-gNB, the CU serving the UE is changing. In this case, a security update needs to be performed. If the handover is intra-gNB and inter-DU/TRP, the CU serving the UE is retained and stays the same and one or both of the DU and TRP are changing and are new. In this case, a security update may not be required. If the handover is intra-gNB and intra-DU/TRP, the serving CU and DU stay the same and the TRP is new. In this case, a security update may not be needed. In some embodiments, the security update is performed when the PDCP layer of the multi-layer protocol stack is changed as part of the handover.

The CU of the gNB initiates transmission of an information element that indicates whether a security update is to be skipped or performed as part of the handover performed by the UE. This information element can be included with the handover information that is communicated to the UE. In some embodiments, the information element is included with the mobility control information sent to the UE.

FIGS. 6A-6C show another example of mobility control information communicated to the UE. The mobility control information is based on the LTE network mobility control information (MobilityControlInfo), but includes an information element called SecurityUpdateSkip 642. The SecurityUpdateSkip field indicates to the UE when the security update can be skipped during the handover. In some embodiments, the SecurityUpdateSkip field is defined as ENUMERATED {true}. If the field is absent, a security update is required with the handover. The processing circuitry of the gNB omits the information element from the transmitted handover information when the handover includes changing to a new CU and a new DU, and sends the information element when the handover includes changing to a new DU and retains the same CU or when the handover includes changing to a new transmitting/receiving point (TRP) and retains the DU and CU.

Alternatively, the SecurityUpdateSkip field is defined as ENUMERATED {true, false}. In this option, the SecurityUpdateSkip field is present in the handover information and the security update is performed according to the state of the field. The processing circuitry of the gNB sends an informational element indicating the security update is to be performed when the handover changes to a new CU and a new DU, sends an informational element indicating the security update is to be skipped when the handover changes to a new DU and retains the same CU, and sends an informational element indicating the security update is to be skipped when the handover includes changing to a new transmitting/receiving point (TRP) and retains the DU and CU.

Figure 7:
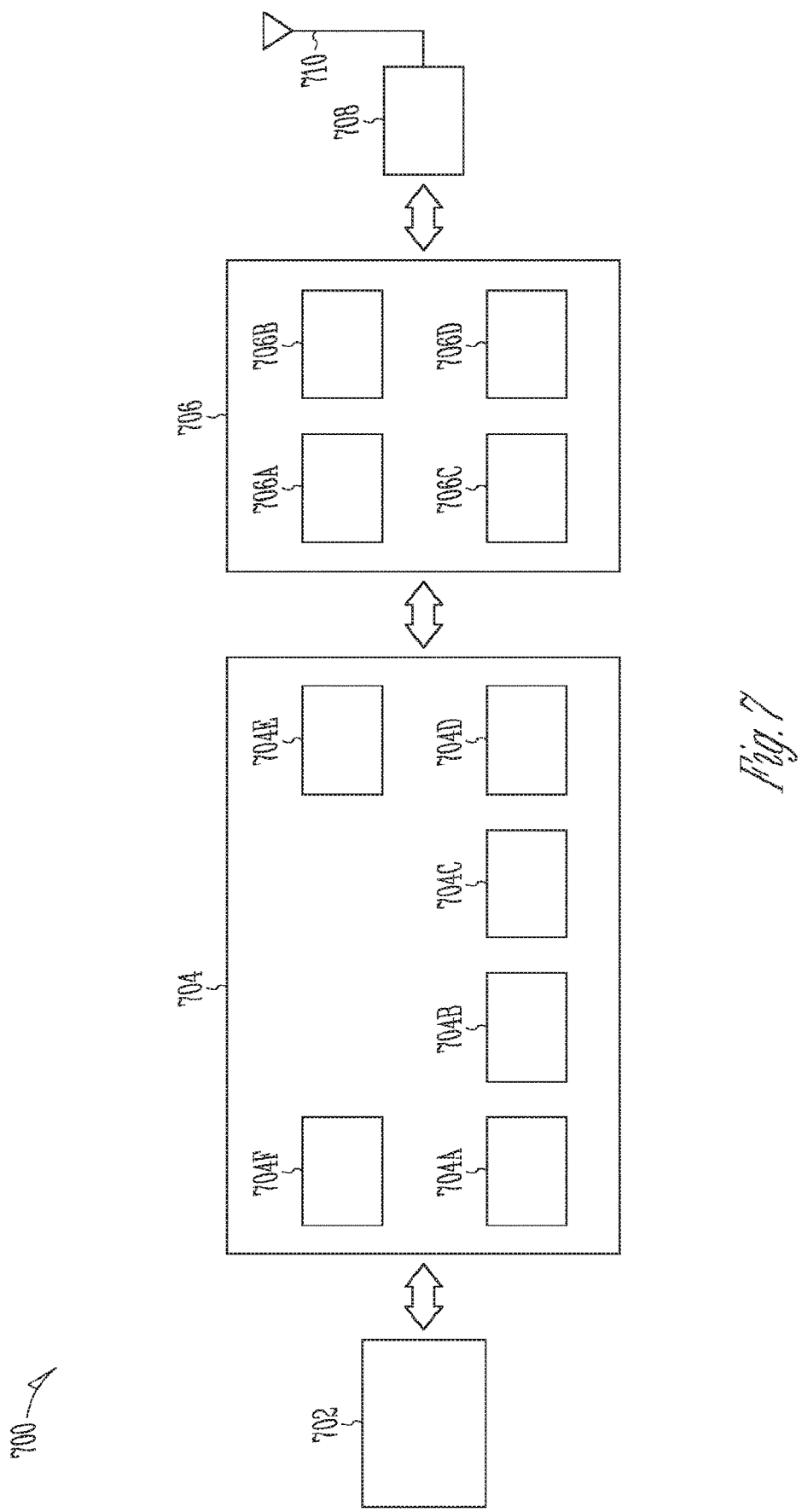
FIG. 7 illustrates example components of a user equipment device in accordance with some embodiments.

FIG. 7 illustrates, for one embodiment, example components of a User Equipment (UE) device 700. In some embodiments, the UE device 700 may include application circuitry 702, baseband processing circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband processing circuitry 704 may include circuitry such as, but not limited to, one or more single-core or multi-core processors. The baseband processing circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband processing circuitry 704 may include a second generation (2G) baseband processor 704A, third generation (3G) baseband processor 704B, fourth generation (4G) baseband processor 704C, and/or other baseband processor(s) 704D for other existing generations or generations in development (e.g., fifth generation (5G), or to be developed in the future (e.g., sixth generation (6G), etc.). The baseband processing circuitry 704 (e.g., one or more of baseband processors 704A-D) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband processing circuitry 704 may include Fast-Fourier Transform (FFT), precoding, and/or constellation mapping/demapping functionality. In some embodiments, encoding/decoding circuitry of the baseband processing circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband processing circuitry 704 may implement elements of a protocol stack such as, for example, elements of an E-UTRAN or NG-RAN multi-layer protocol stack including, for example, physical (PHY), media access control (MAC), radio link control (RLC), packet data convergence protocol (PDCP), and/or radio resource control (RRC) layers. A central processing unit (CPU) 704E of the baseband processing circuitry 704 may be configured to run elements of the protocol stack for signaling of the PHY, MAC, RLC, PDCP and/or RRC layers.

The baseband processing circuitry 704 performs a serving cell handover in response to a received and decoded indication (e.g., from a base station) to perform the handover. If the UE 700 communicates with an NG-RAN, the handover may involve a split in a corresponding base station (BS) multi-layer protocol stack. The indication to perform the handover may include handover information (e.g., network mobility control information (MobilityControlInfo)). The handover information can include an information element (e.g., the protocolReset field of FIGS. 5A-5C) indicating one or more of the PDCP layer, the RLC layer, the MAC layer, and the PHY layer of the UE multi-layer protocol stack are to be reset in association with the handover. The baseband processing circuitry 704 resets the indicated layers of the UE multi-layer protocol stack according to the received information element.

The layers of the UE multi-layer protocol stack have a hierarchy from a highest layer to a lowest layer. In some embodiments, the information element indicates one layer of the UE multi-layer protocol stack, and the baseband processing circuitry 704 resets the indicated layer and the layers of the UE multi-layer protocol stack lower in the hierarchy than the indicated layer. In some embodiments, the different layers of the corresponding BS multi-layer protocol stack are implemented by a central unit (CU) and a distributed unit (DU) with different layers included in the CU and DU as shown in the example of FIG. 4. The handover includes a change in logical layers of the BS multi-layer protocol stack associated with a change to a new DU as part of the handover.

The baseband processing circuitry can perform a security update in association with a serving cell handover. If the UE communicates with an E-UTRAN of an LTE network, the security update is performed with every handover. If the UE 700 communicates with an NG-RAN, the UE may either perform or skip the security update according to the layers of the UE multi-layer protocol stack that are to be reset as part of the handover. In certain embodiments, the baseband processing circuitry only performs a security update when the received reset information element indicates that the PDCP layer is to be reset as part of the handover.

In some embodiments, the baseband processing circuitry 704 receives an information element (e.g., from a BS) indicating whether a security update is to be performed in association with the handover, and either performs or skips the security update according to the information element. The information element can be included in the handover information received. For example, the information element can be a SecurityUpdateSkip field in the network mobility control information (MobilityControlInfo) as in FIGS. 6A-6C). In certain embodiments, the baseband processing circuitry 704 skips the security update when the information element is present in the handover information, and performs the security update when the information element is omitted from the handover information. In certain embodiments, the information element is always included in the handover information, and the baseband processing circuitry 704 either performs or skips the security update according to the value of the information element.

In some embodiments, the baseband processing circuitry may include one or more audio digital signal processor(s) (DSP) 704F. The audio DSP(s) 704F may be include elements for compression/decompression and echo cancellation and may include other suitable processing elements in other embodiments. Components of the baseband processing circuitry may be suitably combined in a single chip, a single chipset, or disposed on a same circuit board in some embodiments. In some embodiments, some or all of the constituent components of the baseband processing circuitry 704 and the application circuitry 702 may be implemented together such as, for example, on a system on a chip (SOC).

In some embodiments, the baseband processing circuitry 704 may provide for communication compatible with one or more radio technologies. For example, in some embodiments, the baseband processing circuitry 704 may support communication with an EUTRAN, NG-RAN and/or other wireless metropolitan area networks (WMAN), a wireless local area network (WLAN), a wireless personal area network (WPAN). Embodiments in which the baseband processing circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband processing circuitry 704. RF circuitry 706 may also include a transmit signal path which may include circuitry to up-convert baseband signals provided by the baseband processing circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706A, amplifier circuitry 706B and filter circuitry 706C. The transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry processing 704 for further processing. In some embodiments, the output baseband signals may be zero-frequency baseband signals, although this is not a requirement. In some embodiments, mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband processing circuitry 704 and may be filtered by filter circuitry 706C. The filter circuitry 706C may include a low-pass filter (LPF), although the scope of the embodiments is not limited in this respect.

In some embodiments, the mixer circuitry 706A of the receive signal path and the mixer circuitry 706A of the transmit signal path may include two or more mixers and may be arranged for quadrature downconversion and/or upconversion respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and/or direct upconversion, respectively. In some embodiments, the mixer circuitry 706a of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband processing circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband processing circuitry 704 or the applications circuitry 702 depending on the desired output frequency. In some embodiments, a divider control input (e.g., N) may be determined from a look-up table based on a channel indicated by the applications circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a transmit/receive (TX/RX) switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the UE device 700 may include additional elements such as, for example, memory/storage, display, camera, sensor, and/or input/output (I/O) interface.

The several embodiments described herein provide for reduced latency in end-to-end voice communications by reducing the latency associated with cell handover of UEs. The base station communicates commands for resetting specified layers of the protocol stack associated with cell handover based on the type of cell handover that occurs.

Additional Description and Examples

Example 1 includes subject matter (such as an apparatus of a base station (BS) of a radio access network (RAN)) comprising: processing circuitry including a central unit (CU) portion and a distributed unit (DU) portion that implement a BS multi-layer protocol stack divided between the CU portion and the DU portion, wherein the processing circuitry is configured to initiate a handover to change a serving cell of user equipment (UE), wherein the handover includes a change in a portion of logical layers of the BS multi-layer protocol stack, and the processing circuitry is configured to encode an information element for transmission to the UE indicating logical layers of a UE multi-layer protocol stack implemented in the UE to be reset by the UE in association with the handover; and memory to store data associated with the information element.

In Example 2, the subject matter of Example 1 optionally includes the CU portion and the DU portion implementing a BS multi-layer protocol stack that includes a radio resource control (RRC) layer, a packet data convergence protocol (PDCP) layer, a radio link control (RLC) layer, a media access control (MAC) layer, and a physical (PHY) layer. The CU portion of the processing circuitry implements a first number of layers of the BS multi-layer protocol stack, and the DU portion of the processing circuitry implements a second number of layers of the BS multi-layer protocol stack. The information element indicates the layers implemented by the processing circuitry of the DU portion of the BS as the layers of the UE multi-layer protocol stack to be reset in association with the handover.

In Example 3, the subject matter of one or both of Examples 1 and 2 optionally include an information element that indicates the UE is to reset one or more of a PDCP layer, an RLC layer, a MAC layer, and a PHY layer of the UE multi-layer protocol stack in association with the handover.

In Example 4, the subject matter of one or any combination of Examples 1-3 optionally include the layers of the UE multi-layer protocol stack having a hierarchy from a highest layer to a lowest layer. The information element indicates a layer of the UE multi-layer protocol stack highest in the hierarchy that is to be reset together with layers lower in the hierarchy by the UE in association with the handover.

In Example 5, the subject matter of one or any combination of Examples 1-4 optionally include processing circuitry configured to encode an information element for transmission to the UE that indicates whether a security update is to be skipped or performed as part of the handover performed by the UE.

In Example 6, the subject matter of one or any combination of Examples 1-5 optionally includes processing circuitry configured to encode an informational element indicating the a security update is to be performed when the handover changes to a new CU and a new DU, encode an informational element indicating the security update is to be skipped when the handover changes to a new DU and retains the same CU, and encode an informational element indicating the security update is to be skipped when the handover includes changing to a new transmission and reception point (TRP) and retains the DU and CU.

In Example 7, the subject matter of one or any combination of Examples 1-6 optionally includes an information element that indicates that a security update is to be skipped in association with the handover performed by the UE, wherein the processing circuitry is configured to encode the information element for transmission when the handover includes changing to a new DU and retains the same CU, or when the handover includes changing to a new transmission and reception point (TRP) and retains the DU and CU.

In Example 8, the subject matter of Example 7 optionally includes processing circuitry configured to omit encoding the information element for transmission when the handover includes changing to a new CU and a new DU.

Example 9 includes subject matter (such as an apparatus of user equipment (UE)), or can optionally be combined with one or any combination of Examples 1-8 to include such subject matter, comprising: processing circuitry configured to: implement a UE multi-layer protocol stack including a radio resource control (RRC) layer, a packet data convergence protocol (PDCP) layer, a radio link control (RLC) layer, a media access control (MAC) layer, and a physical (PHY) layer; perform a serving cell handover in response to a received indication to perform the handover, wherein the handover includes a change to a portion of a base station (BS) multi-layer protocol stack; decode an information element indicating one or more of the PDCP layer, the RLC layer, the MAC layer, and the PHY layer of the UE multi-layer protocol stack are to be reset in association with the handover; and reset the indicated layers of the UE multi-layer protocol stack according to the received information element; and memory to store data associated with the information element.

In Example 10, the subject matter of Example 9 optionally includes the layers of the UE multi-layer protocol stack having a hierarchy from a highest layer to a lowest layer. The information element indicates one layer of the UE multi-layer protocol stack; and the processing circuitry is configured to reset the indicated layer and the layers of the UE multi-layer protocol stack lower in the hierarchy than the indicated layer.

In Example 11, the subject matter of one or both of Example 9 and optionally includes different layers of the BS multi-layer protocol stack implemented by a central unit (CU) and a distributed unit (DU), and the handover includes a change in logical layers of the BS multi-layer protocol stack associated with a change to a new DU as part of the handover.

In Example 12, the subject matter of one or any combination of Examples 9-11 optionally includes processing circuitry configured to perform a security update in association with the handover; and either perform or skip the security update according to the layers of the UE multi-layer protocol stack that are to be reset.

In Example 13, the subject matter of one or any combination of Examples 9-12 optionally includes processing circuitry configured to perform a security update in association with the handover when the information element indicates the PDCP layer of the UE multi-layer protocol stack is to be reset.

In Example 14, the subject matter of one or any combination of Examples 9-13 optionally includes processing circuitry is configured to: decode an information element indicating whether a security update is to be performed in association with the handover; and either perform or skip the security update according to the information element.

Example 15 includes subject matter (such as a computer-readable storage medium that stores instructions for execution by one or more processors of user equipment (UE) to perform operations to configure the UE to: implement a multi-layer protocol stack including a radio resource control (RRC) layer, a packet data convergence protocol (PDCP) layer, a radio link control (RLC) layer, a media access control (MAC) layer, and a physical (PHY) layer; perform a serving cell handover in response to a received indication to perform the handover, wherein the handover includes a change in a portion of a base station (BS) multi-layer protocol stack; decode an information element indicating one or more of the PDCP layer, the RLC layer, the MAC layer, and the PHY layer of the UE multi-layer protocol stack are to be reset in association with the handover; and reset the indicated layers of the UE multi-layer protocol stack according to the received information element.

In Example 16, the subject matter of Example 15 optionally includes instructions that cause the one or more processors of the UE to perform operations to configure the UE to implement the layers of the multi-layer protocol stack with a hierarchy from a highest layer to a lowest layer, decode an information element that indicates one layer of the multi-layer protocol stack; and reset the indicated layer and the layers of the multi-layer protocol stack lower in the hierarchy than the indicated layer.

In Example 17, the subject matter of one or both of Examples 15 and 16 optionally includes instructions that cause the one or more processors of the UE to perform operations to configure the UE to decode an information element that includes a value indicating which of the PDCP, RLC, MAC, and PHY layers to reset in association with the handover; and reset the indicated layers in association with the handover.

In Example 18, the subject matter of one or any combination of Examples 15-17 optionally includes instructions that cause the one or more processors of the UE to perform operations to configure the UE to perform a security update in association with the handover; and either perform or skip the security update according to the layers of the multi-layer protocol stack that are reset.

In Example 19, the subject matter of one or any combination of Examples 15-18 optionally includes instructions that cause the one or more processors of the UE to perform operations to configure the UE to perform a security update in association with the handover when the information element indicates the PDCP layer of the multi-layer protocol stack is to be reset.

In Example 20, the subject matter of one or any combination of Examples 15-19 optionally includes instructions that cause the one or more processors of the UE to perform operations to configure the UE to receive an information element indicating whether a security update is to be performed in association with the handover; and either perform or skip the security update according to the information element.

Example 21 includes subject matter (such as an apparatus of user equipment (UE)), or can optionally be combined with one or any combination of Examples 1-20 to include such subject matter, comprising: processing circuitry configured to perform a serving cell handover in response to a received indication to perform the handover, wherein the handover includes a change to one or both of a new base station central unit (CU) and a new base station distributed unit (DU); and decode an information element indicating whether a security update is to be skipped in association with the handover, and either perform or skip the security update in association with the handover according to the information element; and memory to store data associated with the information element.

In Example 22, the subject matter of Example 21 optionally includes processing circuitry configured to skip the security update when the information element is received with the indication to perform the handover, and perform the security update when the information element is omitted from the indication to perform the handover.

Example 23 includes subject matter (such as an apparatus of a base station (BS) of a radio access network (RAN)), or can optionally be combined with one or any combination of Examples 1-20 to include such subject matter, comprising: memory; and processing circuitry including a central unit (CU) portion and a distributed unit (DU) portion, the processing circuitry configured to initiate a handover to change a serving cell of user equipment (UE), wherein the handover includes a change to one or both of a new CU and a new DU, and the processing circuitry is configured to encode an information element for transmission to the UE indicating whether a security update is to be skipped as part of the handover performed by the UE.

In Example 24, the subject matter of Example 23 optionally includes processing circuitry configured to encode an informational element indicating the security update is to be performed when the handover changes to a new CU and a new DU, encode an informational element indicating the security update is to be skipped when the handover changes to a new DU and retains the same CU, and encode an informational element indicating the security update is to be skipped when the handover changes to a new transmission and reception point (TRP) and retains the DU and CU.

Example 25 includes subject matter (such as a method of controlling operation of user equipment of a radio access network) comprising: implementing a multi-layer protocol stack in the UE including a radio resource control (RRC) layer, a packet data convergence protocol (PDCP) layer, a radio link control (RLC) layer, a media access control (MAC) layer, and a physical (PHY) layer; performing a serving cell handover in response to a received indication to perform the handover, wherein the handover includes a change in a portion of a base station (BS) multi-layer protocol stack; decoding an information element indicating one or more of the PDCP layer, the RLC layer, the MAC layer, and the PHY layer of the UE multi-layer protocol stack are to be reset in association with the handover; and resetting the indicated layers of the UE multi-layer protocol stack according to the received information element In Example 26, the subject matter of Example 25 optionally includes implementing the layers of the multi-layer protocol stack with a hierarchy from a highest layer to a lowest layer, decoding an information element that indicates one layer of the multi-layer protocol stack; and resetting the indicated layer and the layers of the multi-layer protocol stack lower in the hierarchy than the indicated layer.

In Example 27, the subject matter of Example 25 optionally includes decoding an information element that includes a value indicating which of the PDCP, RLC. MAC, and PHY layers to reset in association with the handover; and reset the indicated layers in association with the handover.

In Example 28, the subject matter of one or any combination of Examples 25-27 optionally includes performing a security update in association with the handover; and either performing or skipping the security update according to the layers of the multi-layer protocol stack that are reset.

In Example 29, the subject matter of Example 28 optionally includes performing the security update in association with the handover when the information element indicates the PDCP layer of the multi-layer protocol stack is to be reset.

In Example 30, the subject matter of one or any combination of Examples 25-27 optionally includes receiving an information element indicating whether a security update is to be performed in association with the handover; and either performing or skipping the security update according to the information element.

These non-limiting Examples can be combined in any permutation or combination.

The above detailed description includes references to the accompanying drawings, which form a part of the detailed description. The drawings show, by way of illustration, specific embodiments that can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to impose numerical requirements on their objects.

What is claimed is:

1. An apparatus, comprising:
a memory; and
processing circuitry in communication with the memory, wherein the processing circuitry is configured to:
initiate a handover to change a serving cell of a user equipment (UE), wherein the handover includes a change in a portion of layers of a multi-layer protocol stack; and
encode radio resource control (RRC) information for transmission to the UE, wherein the RRC information includes a first indication to reset radio link control (RLC), wherein the first indication is separate from a second indication for packet data convergence protocol (PDCP) included in the RRC information and a third indication for a security key update in association with the handover included in the RRC information.

2. The apparatus of claim 1,
wherein the processing circuitry comprises a central unit (CU) portion and a distributed unit (DU) portion that implement the multi-layer protocol stack divided between the CU portion and the DU portion.

3. The apparatus of claim 1,
wherein the multi-layer protocol stack that includes an RRC layer, a PDCP layer, an RLC layer, a media access control (MAC) layer, and a physical (PHY) layer;
wherein a central unit (CU) portion of the processing circuitry implements a first number of layers of the multi-layer protocol stack; and
wherein a distributed unit (DU) portion of the processing circuitry implements a second number of layers of the multi-layer protocol stack.

4. The apparatus of claim 1,
wherein the processing circuitry is configured to encode an information element for transmission to the UE that indicates whether a security update is to be skipped or performed as part of the handover performed by the UE.

5. The apparatus of claim 4,
wherein the processing circuitry is configured to:
encode an information element indicating the security update is to be performed when the handover changes from an existing central unit (CU) to a new CU and from an existing distributed unit (DU) to a new DU;
encode an information element indicating the security update is to be skipped when the handover changes to the new DU and retains the existing CU; and
encode an information element indicating the security update is to be skipped when the handover includes changing to a new transmission and reception point (TRP) and retains the existing DU and the existing CU.

6. The apparatus of claim 1,
wherein the processing circuitry is configured to encode an information element for transmission to the UE that indicates that a security update is to be skipped in association with the handover performed by the UE.

7. The apparatus of claim 6,
wherein the processing circuitry is configured to encode the information element for transmission to the UE when the handover includes changing from an existing distributed unit (DU) to a new DU and retains an existing central unit (CU) or when the handover includes changing to a new transmission and reception point (TRP) and retains the existing DU and the existing CU.

8. The apparatus of claim 6,
wherein the processing circuitry is configured to omit encoding the information element for transmission when the handover includes changing from an existing distributed unit (DU) to a new DU and from an existing central unit (CU) to a new CU.

9. An apparatus, comprising:
a memory; and
processing circuitry in communication with the memory, wherein the processing circuitry is configured to:
perform a serving cell handover in response to a received indication to perform the handover, wherein the handover includes a change to a portion of layers of a multi-layer protocol stack; and
decode radio resource control (RRC) information received from a base station, wherein the RRC information includes a first indication to reset radio link control (RLC), wherein the first indication is separate from a second indication for packet data convergence protocol (PDCP) included in the RRC information and a third indication for a security key update in association with the handover included in the RRC information.

10. The apparatus of claim 9,
wherein the processing circuitry is further configured to:
reset the RLC according to the RRC information received from the base station.

11. The apparatus of claim 9,
wherein the processing circuitry is configured to:
perform a security update in association with the handover; and
either perform or skip the security update according to the third indication for the security key update.

12. The apparatus of claim 9,
wherein the processing circuitry is configured to:
perform a security update in association with the handover based on the second indication for PDCP indicating reset of a PDCP layer.

13. A non-transitory computer-readable storage medium that stores instructions executable by one or more processors of a base station to cause the base station to:
initiate a handover to change a serving cell of a user equipment (UE), wherein the handover includes a change in a portion of layers of a multi-layer protocol stack; and
encode radio resource control (RRC) information for transmission to the UE, wherein the RRC information includes a first indication to reset radio link control (RLC), wherein the first indication is separate from a second indication for packet data convergence protocol (PDCP) included in the RRC information and a third indication for a security key update in association with the handover included in the RRC information.

14. The non-transitory computer-readable storage medium of claim 13, wherein the one or more processors comprise a central unit (CU) portion and a distributed unit (DU) portion that implement the multi-layer protocol stack divided between the CU portion and the DU portion.

15. The non-transitory computer-readable storage medium of claim 13,
wherein the multi-layer protocol stack that includes an RRC layer, a PDCP layer, an RLC layer, a media access control (MAC) layer, and a physical (PHY) layer;
wherein a central unit (CU) portion of the one or more processors implements a first number of layers of the multi-layer protocol stack; and
wherein a distributed unit (DU) portion of the one or more processors implements a second number of layers of the multi-layer protocol stack.

16. The non-transitory computer-readable storage medium of claim 13,
wherein the instructions are further executable by the one or more processors of the base station to cause the base station to encode an information element for transmission to the UE that indicates whether a security update is to be skipped or performed as part of the handover performed by the UE.

17. The non-transitory computer-readable storage medium of claim 13,
wherein the instructions are further executable by the one or more processors of the base station to cause the base station to:
encode an information element indicating the security update is to be performed when the handover changes from an existing central unit (CU) to a new CU and from an existing distributed unit (DU) to a new DU;
encode an information element indicating the security update is to be skipped when the handover changes to the new DU and retains the existing CU; and
encode an information element indicating the security update is to be skipped when the handover includes changing to a new transmission and reception point (TRP) and retains the existing DU and the existing CU.

18. The non-transitory computer-readable storage medium of claim 13,
wherein the instructions are further executable by the one or more processors of the base station to cause the base station to encode an information element for transmission to the UE that indicates that a security update is to be skipped in association with the handover performed by the UE.

19. The non-transitory computer-readable storage medium of claim 18,
wherein the instructions are further executable by the one or more processors of the base station to cause the base station to encode the information element for transmission to the UE when the handover includes changing from an existing distributed unit (DU) to a new DU and retains an existing central unit (CU) or when the handover includes changing to a new transmission and reception point (TRP) and retains the existing DU and the existing CU.

20. The non-transitory computer-readable storage medium of claim 18,
wherein the instructions are further executable by the one or more processors of the base station to cause the base station to omit encoding the information element for transmission when the handover includes changing from an existing distributed unit (DU) to a new DU and from an existing central unit (CU) to a new CU.

* * * * *